(12) United States Patent
Lee (10) Patent No.: US 11,055,027 B1
(45) Date of Patent: Jul. 6, 2021

(54) DYNAMIC QUEUE MANAGEMENT

(71) Applicant: Rapid7, Inc., Boston, MA (US)

(72) Inventor: Austin Formosa Lee, Burbank, CA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 16/685,633

(22) Filed: Nov. 15, 2019

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,094,694 | A * | 7/2000 | Hickson | G06F 9/546 455/564 |
| 6,182,120 | B1 * | 1/2001 | Beaulieu | G06F 9/4881 709/200 |
| 7,035,852 | B2 * | 4/2006 | Hopewell | G06F 9/546 |
| 7,127,507 | B1 * | 10/2006 | Clark | H04L 43/045 709/224 |
| 7,543,181 | B2 * | 6/2009 | Buxton | G06F 11/1471 714/15 |
| 7,680,793 | B2 * | 3/2010 | Wong | G06F 16/2365 707/999.008 |
| 7,849,468 | B2 * | 12/2010 | Dinh | G06F 9/546 719/313 |
| 2018/0013714 | A1 * | 1/2018 | Leach | H04L 51/16 |

* cited by examiner

*Primary Examiner* — Elias Mamo
(74) *Attorney, Agent, or Firm* — Ashwin Anand (57) ABSTRACT

Methods and systems for managing queues are disclosed. The disclosed methods involve receiving, at an interface, a request to store a message in a queue, storing the message as a row in a key-value data store, extracting at least one attribute from the message; and selecting the message for processing based on the at least one extracted attribute.

12 Claims, 4 Drawing Sheets

FIG. 1

| QueueName (org. + name) | Message UUID | AttrA | AttrB | AttrC |
|---|---|---|---|---|
| ... | ... | ... | ... | ... |
| ... | ... | ... | ... | ... |
| ... | ... | ... | ... | ... |
| QueueName (org. + name) | Message UUID | AttrA | AttrB | AttrC |
| ... | ... | ... | ... | ... |
| ... | ... | ... | ... | ... |
| ... | ... | ... | ... | ... |
| QueueName (org. + name) | Message UUID | AttrA | AttrB | AttrC |
| ... | ... | ... | ... | ... |
| ... | ... | ... | ... | ... |
| ... | ... | ... | ... | ... |

| QueueName (org. + name) | Message UUID | AttrA | AttrB | AttrC |
|---|---|---|---|---|
| ... | ... | ... | ... | ... |
| ... | ... | ... | ... | ... |
| ... | ... | ... | ... | ... |

DYNAMIC QUEUE MANAGEMENT

TECHNICAL FIELD

Embodiments described herein generally relate to methods and systems for data storage and retrieval and, more particularly but not exclusively, to methods and systems implementing queues for data storage and retrieval.

BACKGROUND

Product vendors or other types of service providers often receive large amounts of data from one or multiple customers. These service providers may execute event systems that are tasked with analyzing the received data in accordance with one or more criteria, initiating some type of workflow in response to the analysis, and providing some type of report or summary regarding the received data. Event systems that have downstream batch processing workflows often have to group the received data by various attributes. These attributes can be organization, application, customer, data type, etc.

The act of grouping essentially represents the placement of related events in a queue. However, most available queue systems have a cost associated with the creation of each queue that can hinder the processing of large quantities of data. For queue systems that are dynamic, they often do not have durable persistence. Both types of queue systems are also typically limited in the number of queues and in the number of messages per queue that can be supported.

For example, existing queueing technologies include redis-backed queues that use libraries such as redisson. However, these types of technologies are completely memory-based. This makes these technologies susceptible to, e.g., power failures, which can result in the loss of messages or other types of data.

RabbitMQ® has dynamic queue capabilities as well. However, it is generally difficult to create dynamic queues with RabbitMQ®, as users have to predefine attributes that define the dynamic portion(s) of the queue. Specifically, a queue is defined by a "bind key." In operation, if a message matches a queue's blind key, then a queue is created. In other words, in order for a queue to exist, a user must know what messages are in their system and also define the queue based on the messages to be matched therewith.

Other existing techniques involve a user creating queues for processing. However, these processes are generally time consuming and labor intensive.

A need exists, therefore, for systems and methods that overcome the disadvantages of existing queueing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of managing queues. The method includes receiving, at an interface, a request to store a message in a queue; storing the message as a row in a key-value data store that includes at least one primary key that is composed of a first partition key and a first sort key, wherein the queue is associated with a partition in the data store; extracting, using a processor executing instructions stored on memory, at least one attribute from the message; and selecting, using the processor, the message for processing based on the at least one extracted attribute.

In some embodiments, the data store includes a plurality of partitions that are each associated with a different queue.

In some embodiments, the at least one attribute includes at least one of age of the message and sensitivity of the message.

In some embodiments, the partition includes a plurality of messages, and the method further includes: performing, using the processor, an attribute analysis on each of the plurality of messages; and elevating for processing a message within the partition based on the attribute analysis.

In some embodiments, the method further includes associating a unique identifier of the message to the first sort key of the queue.

In some embodiments, the primary key is composed of: an organization and a name, an organization and a sub-division, a country and a state, or a country and a city.

In some embodiments, the data store includes a plurality of partitions that are each associated with a queue, and the method further includes elevating at least one of the queues for analysis based on a number of messages within the queue and an existence duration of the queue. In some embodiments, the method further includes deprioritizing at least a second queue based on a number of messages within the second queue and an existence duration of the second queue.

According to another aspect, embodiments relate to a system for managing queues.

The system includes an interface for at least receiving a request to store a message in a queue; a key-value data store that includes at least one primary key that is composed of a first partition key and a first sort key, wherein the queue is associated with a partition in the data store; and a processor executing instructions stored in memory configured to extract at least one attribute from the message and select the message for processing based on the at least one extracted attribute.

In some embodiments, the data store includes a plurality of partitions that are each associated with a different queue.

In some embodiments, the at least one attribute includes at least one of age of the message and sensitivity of the message.

In some embodiments, the partition includes a plurality of messages and the processor is further configured to perform an attribute analysis on each of the plurality of messages and elevate for processing a message within the partition based on the attribute analysis.

In some embodiments, a unique identifier of the message is associated with the first sort key of the queue.

In some embodiments the processor is further configured to associate the message with a primary key that is unique to the queue. In some embodiments, the primary key is composed of: an organization and a name, an organization and a sub-division, a country and a state, or a country and a city.

In some embodiments, the data store includes a plurality of partitions that are each associated with a queue, and the processor is further configured to elevate at least one of the queues for analysis based on a number of messages within the queue and an existence duration of the queue. In some embodiments, the processor is further configured to deprioritize at least a second queue based on a number of messages within the second queue and an existence duration of the second queue.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

As discussed previously, existing queueing technologies generally are not dynamic in nature and require significant amounts of time to process incoming data. Oftentimes, the order in which the incoming data is processed is static in nature and incoming data is not processed in ways that are necessarily logical or expeditious.

Some existing queueing technologies are generally memory-based. This makes these technologies susceptible to power loss or memory failure, which can result in system failure and the loss of messages or other data.

To address these shortcomings, the systems and methods described herein provide a dynamic queueing system based on DynamoDB or another type of key-value store style structure. Although terminology may vary across different individual stores, these types of stores generally include a primary key that serves as a unique identifier and is composed of a partition key and a sort key. These types of data stores may be used for storing, retrieving, and managing associative data.

For example, each row within DynamoDB consists of a partition key and a sort key, followed by any number of key-value attributes that a user may define or that are automatically generated. Accordingly, the data stores used in conjunction with the embodiments described herein include a key that is made up of a partition key and the sort key, as well as any other attributes associated with key.

In order to present a queue-style interface for a user, a queue-style application programming interface (API) is supplied for interactions with the data store. The systems and methods described herein therefore adapt the tabular style format of these key-value style data stores to present a familiar and easy-to-understand queue style interface for data storage and retrieval.

The first object of the queue interface of the embodiments described herein is the "QueueName" class which may contain two fields: organization and name. Combined, these two fields represent a unique key. This key represents a queue instance that has the ability to hold one or more messages. "Message" is the other object of the queue interface and contains the actual information or data about the event and is associated with a queue via the QueueName object until it is removed from the queue.

All messages may contain a universally unique identifier (for simplicity, "UUID") that maps to the sort key of DynamoDB or other types of key-value pair data store structures in which a key is a composition of a partition and the sort key. The message may also contain or otherwise be associated with any number of attributes to provide additional information about the event to support higher level constructs. These attributes may include, but are not limited to, message priority, message age, or any user-defined content that users wish to provide. The flexibility to associate different types of information with messages allows the systems and methods described herein to implement queue style features such as FIFO (first in, first out), LIFO (last in, first out), and priority-based queues.

Below is a table that shows how messages are adapted for DynamoDB or for another key-value style data store for a particular queue:

TABLE 1

| Queue storage configuration | | | | |
|---|---|---|---|---|
| Partition Key | Sort Key | AttrA | AttrB | AttrC |
| QueueName | Message UUID | . . . | . . . | . . . |

As seen in Table 1, a queue in DynamoDB may be defined by a partition key. Sort keys are attached to a message's UUID so the association between message and queue is established. The number of attributes and their content are dynamic and can be any number of any type and at any time. Although the present application largely discusses that a partition key is based on an organization and name field, the partition key can be based on a number of various attributes. That is, the primary key can be flexible, and can be composed of, for example, an organization field (partition key) and a name field (sort key); an organization and a subdivision; a country and a state; or a country and city. These are merely examples of partition and sort keys that can compose the primary key, and any other primary keys may be used in conjunction with the embodiments described herein.

This is another drawback of existing technologies such as redis, which is strictly a key-value database. There is no concept of partitions in these types of existing technologies, and a user would therefore have to build keys in a fashion to ensure that one message doesn't overwrite another.

Additionally, a user may define their UUID. For example, a user could use standard UUID generators to guarantee uniqueness. Or, they could use entity identifiers that are unique with respect to entities, but don't guarantee uniqueness in all cases.

For example, a message for a first entity may come in on two consecutive days. However, the message on the second day may overwrite the first day's message since the UUID is defined by the entity identifier. In order to be truly unique, a user could use a standard UUID generator or add a unique piece to the sort key of the entity identifier.

Accordingly, the embodiments described herein allow users to implement a dynamic queue system that can span thousands of potential queues without the need to implement any pre-provisioning of queues. Then, with these various queues, the embodiments described herein may be able to perform differential analysis among queues. As discussed above, the embodiments described herein may be based on DynamoDB or other types of key-value data structures to provide durability, scale, and convenience. This has proven to be a successful use case for batch-style processing systems where data or messages must be grouped by some key before being processed. Messages may also be schema-less, and may be analyzed in conjunction with different queue types such as queue sets, priority-based queues, FIFO queues, LIFO queues, etc.

Additionally, the embodiments described herein offer a number of advantages over existing techniques for managing queues. For example, there is no limit on the number of queues or the number of messages within each queue that may be supported. These embodiments also offer the ability to scale up/down read or write operations via the AWS® Dynamo API, and offer customizable sorting for queues based on statistics such as fairness (discussed below), size, age, or other attributes that may help determine which queue should be processed next. The embodiments described herein also provide for much more durability than existing techniques that are memory-based (e.g., Redisson).

The features of the embodiments described herein are not limited to key-value style data stores either. Rather, non-key-value data stores may leverage the features of the embodiments described herein as long as they implement or otherwise include the concept of partitions. This may not be as flexible in dynamically creating new queues, but it is possible to create partitions as needed.

Figure 1:
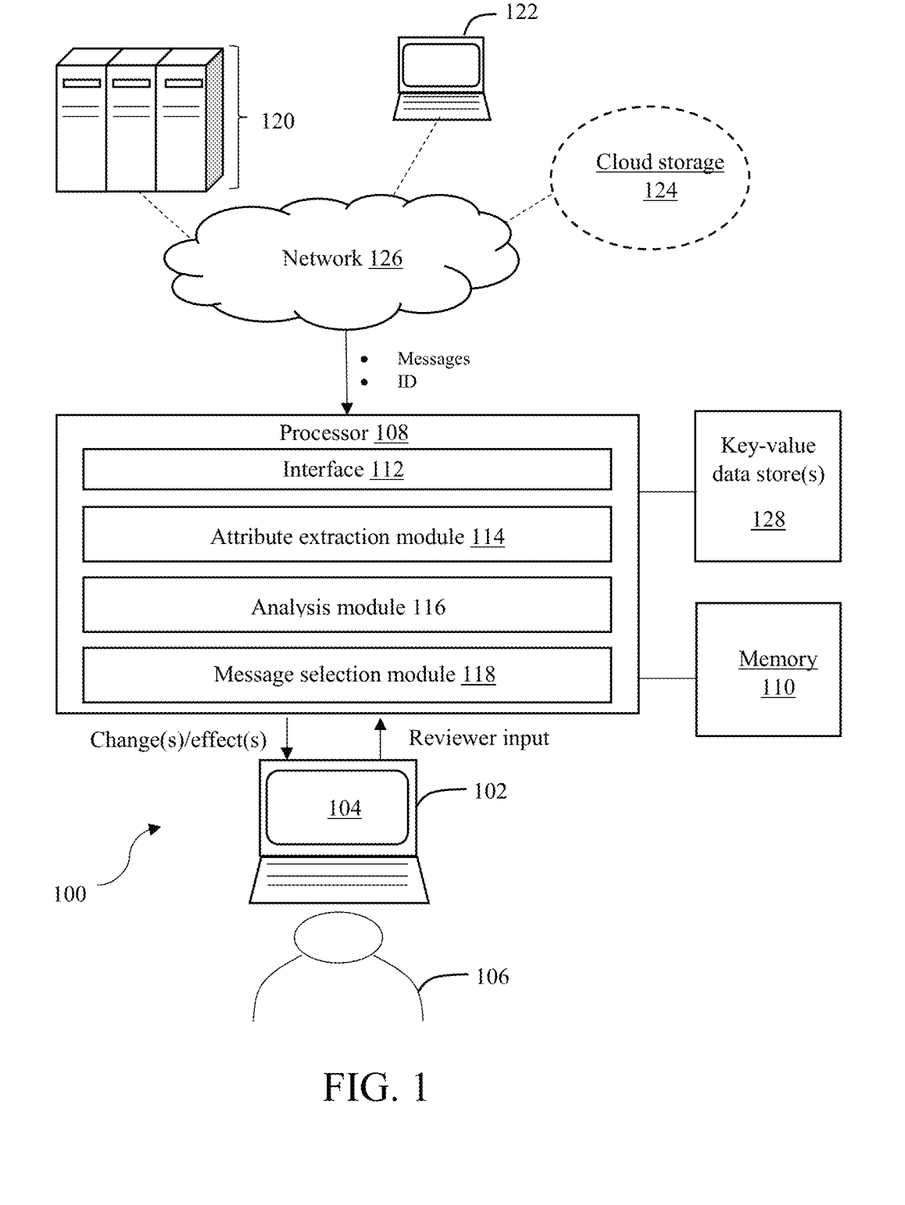
FIG. 1 illustrates a system for managing queues in accordance with one embodiment.

FIG. 1 illustrates a system 100 for managing queues in accordance with one embodiment. The system 100 may include a user device 102 executing a user interface 104 for presentation to one or more users 106 such as a service provider personnel tasked with reviewing and managing incoming data from clients.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to specify and view certain queues or messages for analysis, as well as attributes associated with messages.

The user 106 may be an employee of a product vendor or service provider interested in monitoring queues and messages or other data from various clients. The user 106 may rely on the user interface 104 to define or view various attributes associated with received message data. The system 100 reduces the need for the user 106 to manually create queues. Rather, these queues may be automatically generated as the messages are received.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, an attribute extraction module 114, an analysis module 116, and a message selection module 118.

The interface 112 may receive messages from one or more clients 120, 122, and 124 over one or more networks 126. The clients 120, 122, and 124 may include servers, devices, storages, or the like, that are associated with clients or customers of a vendor or service provider. For example, the clients 120, 122, and 124 may have hired a vendor associated with the processor 108 to perform some type of analysis on the clients' message data. Each message may be associated with some identification label (ID), such that messages associated with the same client can be grouped together.

The network(s) 126 may link the various assets and components with various types of network connections. The network(s) 126 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 126 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The interface 112 may receive messages in batches or otherwise at predetermined time intervals. For example, messages may be communicated to the interface 112 once every hour. The frequency at which messages are sent over the network(s) 126 to the interface 112 may vary and may be determined or set by the user 106 or personnel associated with the clients 120, 122, and 124.

The messages and any associated data may be stored in and accessed from one or more data stores 128. As discussed previously, the data store(s) 128 are key-value style data stores in which data includes a primary key that is composed of a partition key and a sort key, such as that presented in Table 1 above.

The processor 108 may connect to any key-value data store in which data is stored such as in Table 1. The data store(s) 128 can be associated with a client and accessed over the network 126 or locally in the same system. The exact configuration or location of the data store(s) 128 may vary as long as the system 100 can locate the required data in order to read and write messages in the format of FIG. 1.

Figure 2:
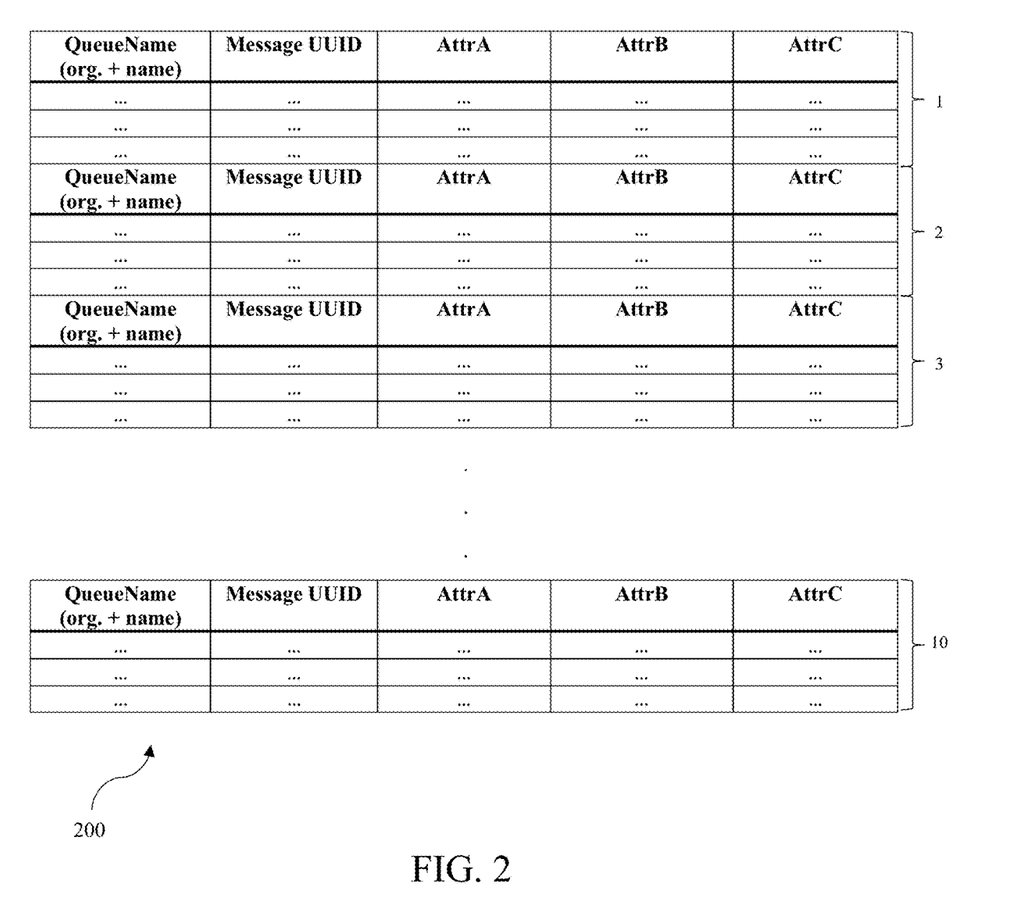
FIG. 2 illustrates a plurality of partitions associated with a queue in accordance with one embodiment.

Specifically, each row in the data store(s) 128 may represent a message. For example, FIG. 2 illustrates a table 200 comprising a plurality of queues with messages that may be stored in one or more data store(s) 128. To avoid "hot" partitions while otherwise collecting statistical information on the queues, the analysis module 116 may reserve partitions specifically for storing statistics. The analysis module 116 may store these statistics as separate rows within the designated statistics partitions.

For example, and as seen in FIG. 2, the analysis module 116 may assign ten partitions for statistics. Each partition may represent a queue or a portion thereof. A queue may be assigned to a particular partition in a sticky fashion, meaning that messages will not be moved from one partition to another. Using a hashing algorithm, the processor 108 may consider the contents of the QueueName value to compute the partition number (i.e., the partition to which a message is assigned). From there, the analysis module 116 may compute and store statistics for the queues.

Figure 3:
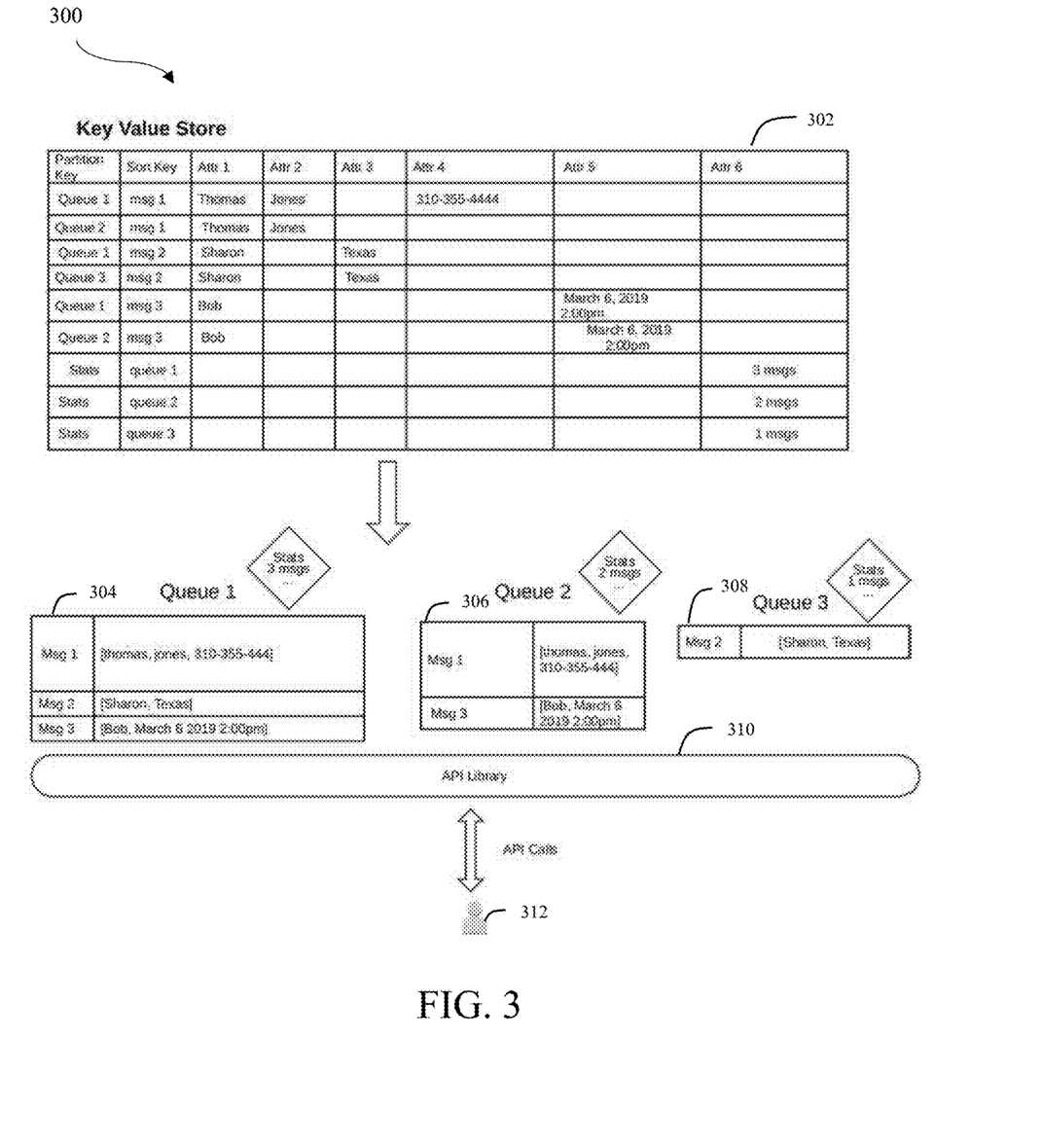
FIG. 3 illustrates an analysis of a key-value store data structure in accordance with one embodiment.

FIG. 3 illustrates the analysis 300 of a key value store 302 in accordance with one embodiment. As seen in FIG. 3, the key value store 302 includes a plurality of keys, one or more messages associated with each queue, and various attributes associated with particular messages. For example, message 1 of Queue 1 has name attributes ("Thomas" and "Jones") and a phone number attribute ("310-355-4444"). Extracted attributes may provide data regarding, for example and without limitation, message size, message age, message priority, message sensitivity (e.g., whether the message contains confidential data), or any other data including user-defined data related to the message(s). The attribute extraction module 114 may extract these types of attributes and provide the attributes to the analysis module 116.

The analysis module 116 may compute statistics on the queues and their contents. Since potentially there can be thousands of queues, a user such as the user 106 may want to know which queues have the most messages as well as which queue(s) should have their messages processed next. Accordingly, users 106 and clients can be assured that messages are processed in an appropriate manner and order.

For example, FIG. 3 also illustrates the key value store 302 being separated into three partitions that are associated with Queue 1 304, Queue 2 306, and Queue 3 308. As seen in FIG. 3, each queue 304, 306, and 308 includes messages from the key value store 302 and attributes associated with the included messages.

The statistics may contain information about a queue, including when it was created, how many messages it contains, the last update time, etc. This allows a user such as the user 106 to find the largest queues by message size or most important queues by fairness. In the context of the present application, the term "fairness" may be based on factors such as the number of messages in a queue and their existence duration. A higher fairness value indicates that the associated queue should be processed next. This allows users to guarantee that smaller queues will not remain unprocessed in favor of, for example, larger and highly-used queues.

The message selection module 118 may also provide various types of queues such as FIFO (first in, first out), LIFO (last in, first out), and priority-based queues. As discussed above, this may be done based on the attributes assigned to every message. For priority-based queues, a user such as the user 106 may provide a value to represent a "priority" attribute. Similarly, attributes reflecting the time of creation of the message may be used to implement LIFO/FIFO functionality.

The queues and their accompanying statistics in the one or more data stores 128 may be accessed through an API library 310. A user 312 such as the user 106 of FIG. 1 may then choose or at least monitor which queues (and associated messages) should be processed next.

The user 312 may choose certain queues or messages for processing in accordance with any number of criteria. For example, the user may configure the message selection module 118 to select messages in accordance with specified criterion.

In some embodiments, the message selection module 118 may select the queues with the oldest messages for processing first (i.e., FIFO). As another example, the message selection module 118 may select the queue that has the most messages therein for processing first. In this case, and with reference to FIG. 3, the message selection module 118 would select Queue 1 304 for processing first.

Figure 4:
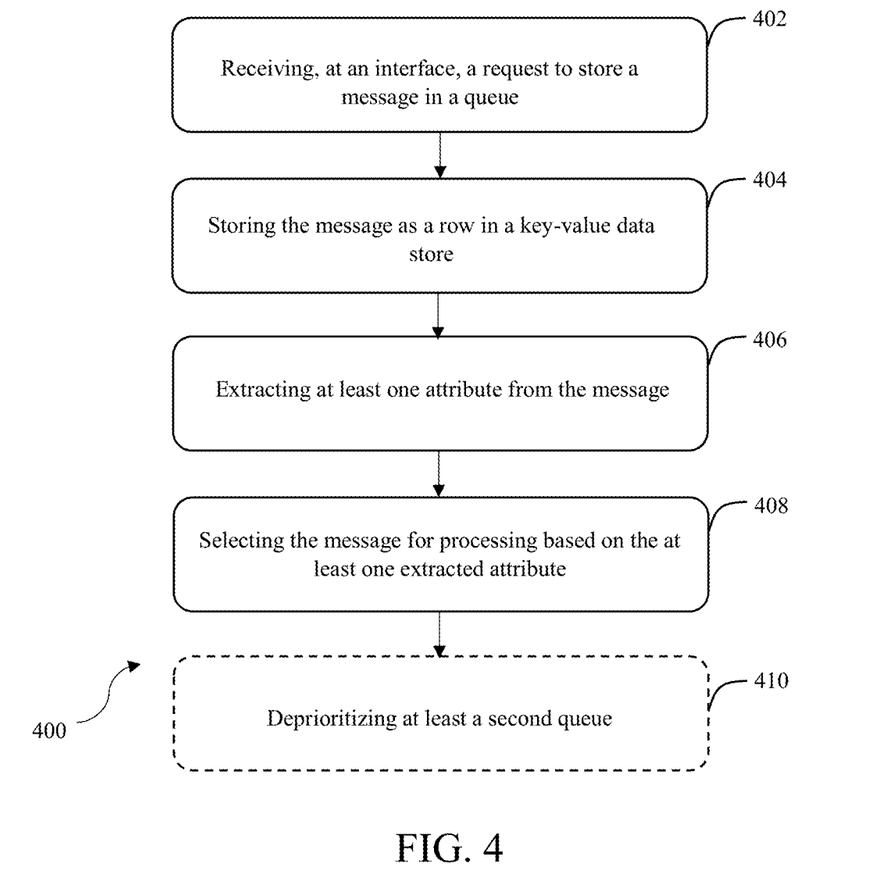
FIG. 4 depicts a flowchart of a method of managing queues in accordance with one embodiment.

FIG. 4 depicts a flowchart of a method 400 of managing queues in accordance with one embodiment. The system 100 or the components thereof of FIG. 1 may perform the steps of method 400.

Step 402 involves receiving, at an interface, a request to store a message in a queue. The message may be received over one or more networks from one or more clients. In this case, a vendor or other type of service provider may be tasked with receiving incoming messages, processing the incoming messages, and then performing some further action. For example, the vendor may be tasked with informing their client that the former detected malicious or otherwise unusual activity in connection with the received message(s).

Step 404 involves storing the message as a row in a key-value data store, wherein the queue is associated with a partition in the data store. The incoming message(s) may be stored in a key-value data store until the vendor is able to process the message(s). The data store may be divided into a plurality of partitions that each contain one or more messages. This division avoids having too many messages being associated with the same key, and therefore avoids a particular partition or queue becoming "hot" and failing.

Step 406 involves extracting, using a processor executing instructions stored on memory, at least one attribute from the message. An attribute extraction module such as the attribute extraction module 114 may gather certain data related to one or more messages of one or more queues. These attributes may be related to, for example, the age of the message, the size of the message, a priority level of the message, whether the message includes sensitive information, or the like.

Step 408 involves selecting, using the processor, the message for processing based on the at least one extracted attribute. As discussed above, a message may be selected based on the message possessing one or more various attributes. For example, the oldest message in a queue may be selected for processing based solely on the fact that it is the oldest message in the queue. As another example, larger messages may be selected for processing before smaller messages are selected.

Step 410 involves deprioritizing at least a second queue based on a number of messages within the second queue and the existence duration of the second queue. Similar to Step 408, the message selection module 118 may opt to not process a message based on one or more extracted attributes. For example, if the message selection module 118 was configured to process older messages first, the message selection module 118 may specifically deprioritize more recently-received messages so that they are not processed until older messages are processed first.

Accordingly, the systems and methods described herein provide a dynamic queueing system that can support potentially thousands of queues at any time and are able to compare and contrast among queues to make decisions regarding which queue(s) should be processed and in what order.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of managing queues, the method comprising:
   receiving, at an interface, a request to store a message in a queue;
   storing the message as a row in a key-value data store that includes at least one primary key that is composed of a first partition key and a first sort key, wherein the queue is associated with a partition in the data store and the data store includes a plurality of partitions that are each associated with a queue;
   elevating the queue storing the message for analysis based on a number of messages within the queue and an existence duration of the queue;
   deprioritizing at least a second queue based on a number of messages within the second queue and existence duration of the second queue;
   extracting, using a processor executing instructions stored on memory, at least one attribute from the message; and
   selecting, using the processor, the message for processing based on the at least one extracted attribute.

2. The method of claim 1 wherein the at least one attribute includes at least one of age of the message and sensitivity of the message.

3. The method of claim 1 wherein the partition includes a plurality of messages, and the method further includes:
   performing, using the processor, an attribute analysis on each of the plurality of messages, and
   elevating for processing a message within the partition based on the attribute analysis.

4. The method of claim 1 further comprising associating a unique identifier of the message to the first sort key of the queue.

5. The method of claim 1 wherein the at least one primary key is unique to the queue.

6. The method of claim 5 wherein the primary key is composed of:
   an organization and a name;
   an organization and a sub-division;
   a country and a state; or
   a country and a city.

7. A system for managing queues, the system comprising:
   an interface for at least receiving a request to store a message in a queue;
   a key-value data store that includes at least one primary key that is composed of a first partition key and a first sort key, wherein the queue is associated with a partition in the data store and the data store includes a plurality of partitions that are each associated with a queue; and
   a processor executing instructions stored in memory configured to:
      elevate the queue storing the message for analysis based on a number of messages within the queue and an existence duration of the queue,
      deprioritize at least a second queue based on a number of messages within the second queue and existence duration of the second queue,
      extract at least one attribute from the message, and
      select the message for processing based on the at least one extracted attribute.

8. The system of claim 7 wherein the at least one attribute includes at least one of age of the message and sensitivity of the message.

9. The system of claim 7 wherein the partition includes a plurality of messages and the processor is further configured to:
   perform an attribute analysis on each of the plurality of messages; and
   elevate for processing a message within the partition based on the attribute analysis.

10. The system of claim 7 wherein a unique identifier of the message is associated with the first sort key of the queue.

11. The system of claim 7 wherein the processor is further configured to associate the message with a primary key that is unique to the queue.

12. The system of claim 11 wherein the primary key is composed of:
   an organization and a name;
   an organization and a sub-division;
   a country and a state; or
   a country and a city.

* * * * *